United States Patent [19]

Sato et al.

[11] Patent Number: 4,603,117

[45] Date of Patent: Jul. 29, 1986

[54] HYDROCARBON CATALYTIC CRACKING CATALYST COMPOSITIONS

[75] Inventors: Goro Sato; Masamitsu Ogata; Izumi Takano, all of Kita-Kyushu, Japan

[73] Assignee: Catalysts & Chemicals Industries Co., Ltd., Tokyo, Japan

[21] Appl. No.: 714,155

[22] Filed: Mar. 20, 1985

[30] Foreign Application Priority Data

Mar. 21, 1984 [JP] Japan ................................. 59-53898

[51] Int. Cl.$^4$ ............................................ B01J 29/06
[52] U.S. Cl. ........................................ 502/65; 502/64
[58] Field of Search ........................... 502/64, 65, 73

[56] References Cited

U.S. PATENT DOCUMENTS 3,939,058  2/1976  Plank et al. ...................... 502/65 X

FOREIGN PATENT DOCUMENTS 1245349  9/1971  United Kingdom ................. 502/64

Primary Examiner—Carl F. Dees
Attorney, Agent, or Firm—Flynn, Thiel, Boutell & Tanis

[57] ABSTRACT

Incorporation of a lithium component in a composition comprising a porous siliceous matrix and a crystalline aluminosilicate dispersed therein provides a hydrocarbon catalytic cracking catalyst having superior cracking activity and selectivity and also having a superior thermal and hydrothermal stability.

7 Claims, No Drawings

HYDROCARBON CATALYTIC CRACKING CATALYST COMPOSITIONS

BACKGROUND OF THE INVENTION

The present invention relates to hydrocarbon cracking catalyst compositions, in particular relates to catalyst compositions which not only display high catalytic activity and gasoline selectivity when used in catalytic cracking of hydrocarbons but also have superior thermal and hydrothermal stability.

As the hydrocarbon cracking catalyst compositions, there have generally been used those comprising a crystalline aluminosilicate zeolite dispersed in a porous matrix such as silica, silica-alumina, silica-zirconia, silica-boria and the like. As is generally known, catalytic cracking of hydrocarbon is explained by reference to the carbonium-ion mechanism, wherein the acid point of a solid catalyst functions as the active site, but this acid point is easily poisoned by the alkali metals present in the catalyst. Due to this, it is customary that alkali metals have been removed from the cracking catalyst as much as possible by means of ion exchange or washing, and especially when water glass, sodium aluminate, crystalline aluminosilicate in the sodium form and the like are employed as the materials for preparing catalyst, largest efforts have been made in order to remove the sodium derived from these materials which is liable to remain in the catalyst.

Sodium is not preferable also in the point of promoting the sintering of catalysts. In the catalytic cracking process, the catalyst is exposed to high temperatures repeatedly because said process comprises the steps of using the catalyst normally at a reaction temperature of about 500° C., burning the coke deposited on the catalyst during the reaction at a temperature of about 650° C. for regenerating the catalyst, and then using said regenerated catalyst again in the reaction zone. Accordingly, when sodium remains in excess of its tolerable amount, it leads to the results that breakage of the crystals of crystalline aluminosilicate zeolite and sintering of the porous matrix are promoted by the sintering accelerating action of sodium, and the thermal and hydrothermal stability and the catalytic activity of the catalyst deteriorate.

In short, alkali metals typified by sodium have been considered not preferable as components of cracking catalysts, and therefore the amounts of alkali metals contained in the usual cracking catalysts have been minimized so as to be 1.0 wt. % or less, calculated as the oxide.

SUMMARY OF THE INVENTION

We have investigated the influence of alkali metal components on and have cracking catalyst found that lithium does not exert the above mentioned bad influence on said catalyst as the sodium does, and positive introduction of the lithium component in the catalyst is rather exceedingly effective for improving the activity, selectivity and also enhancing the thermal and hydrothermal stability of the catalyst.

Accordingly, the present invention provides a hydrocarbon cracking catalyst composition comprising a porous matrix, a crystalline aluminosilicate zeolite dispersed therein and a lithium component.

DETAILED DESCRIPTION

The catalyst composition according to the present invention can be prepared by mixing a precursor of a porous matrix with a crystalline aluminosilicate zeolite an aqueous slurry, spray-drying this slurry to obtain in fine spherical particles, and thereafter introducing a predetermined amount of lithium in the resulting fine spherical particles. As the precursor of the porous matrix, there can be used hydrosol or hydrogel which produces the porous silica-containing inorganic oxides represented by silica, silica-alumina, silica-zirconia, silica-boria and the like by heating, and further admixtures of alumina, kaolin, bentonite and the like with said hydrosol and/or hydrogel. Apart from the fact that any precursor is used, the catalyst composition of the present invention must contain 5 wt. % or more of the silica derived from the hydrosol or hydrogel.

As the crystalline aluminosilicate zeolite, there can be used the hydrogen exchanged- or rare earth metal exchanged-crystalline aluminosilicate zeolite prepared with a natural or synthetic crystalline aluminosilicate zeolite as starting material, and the so-called ultra-stable crystalline aluminosilicate zeolite is also included therein. Generally speaking, the hydrogen exchanged-crystalline aluminosilicate zeolite is prepared by ion-exchanging the alkali metal of natural or synthetic aluminosilicate zeolite with ammonium ion and thereafter calcining said aluminosilicate zeolite, but since the catalyst used in the actual catalytic cracking reaction is subject to substantially the same action as this sintering, the crystalline aluminosilicate zeolite to be mixed with the precursor of the porous matrix may be the ammonium ion exchanged-one. The crystalline aluminosilicate content in the catalyst composition according to the present invention is generally in the range of 5–50 wt. %.

The aqueous slurry mixed with the precursor of the porous matrix and the crystalline aluminosilicate zeolite is spray-dried by means of the conventional conditions and apparatuses, and the lithium component is introduced in the thus obtained fine spherical particles.

Introduction of the lithium component is carried out by impregnating the fine spherical particles with a solution of lithium chloride, lithium nitrate, lithium sulfate, lithium hydroxide or the like after said particle has been washed until the sodium amount contained therein is reduced to 1.0 wt. % or less as oxide and preferably after the said particle has been dried. It is natural in this instance that the lithium component preferably should be distributed uniformly all over the particle. The amount of the lithium component introduced is adjusted to be in the range of 0.1–5.0 wt. % of the final catalyst composition as oxide. In case the amount of the lithium component is less than this range, the effects expected from the introduction of the lithium component can not be displayed, while in case the amount of the lithium component is over said range, the catalytic activity rather deteriorates. After the predetermined amount of lithium component has been introduced in the fine spherical particle, said particle is washed, as occasion demands, to remove the anion derived from the lithium compound used at the time of introducing the lithium component, and thereafter dried, whereby the catalyst composition according to the present invention can be obtained.

The catalyst composition of the present invention is made a solid acid whose acidity is moderate as a whole because the acid points having a comparatively high acidity are selectively poisoned by the lithium component and the solid acid characteristics of the catalyst are modified. Accordingly, in case the catalyst composition of the present invention is used, overcracking of hydrocarbon can be suppressed and gasoline selectivity can be improved. Although the lithium component is considered to take the oxide form in the catalyst composition of the present invention, the lithium oxide has a high melting point unlike the sodium oxide, and therefore does not bring about breakage of the crystals of crystalline aluminosilicate zeolite even when the catalyst is exposed to high temperatures repeatedly. Accordingly, the catalyst composition of the present invention is of a higher thermal and hydrothermal stability as compared with the same kind of catalyst which does not contain the lithium component, and can exhibit high catalytic activity and gasoline selectivity even when subjected to steaming at high temperatures. In addition thereto, the catalyst composition of the present invention can display a superior CO-oxidizing faculty at the time of regenerating the catalyst and can increase the $CO_2/CO$ molar ratio of the gas generated from combustion of coke. Therefore, the catalyst composition of the present invention can ensure a good result when the catalyst is regenerated.

The present invention will be explained concretely with reference to Examples hereinafter. However, it is to be noted that the present invention should not be limited to these Examples.

EXAMPLE 1

A commercially available water glass No. 3 (JIS K 1408) was diluted to prepare a water glass solution having a $SiO_2$ concentration of 11.2%. A 10.5% aluminum sulfate solution was prepared separately. The water glass solution and the aluminum sulfate solution were mixed continuously in the ratios of 20 l/min. and 10 l/min. respectively for 10 minutes to thereby prepare a gel. This gel was aged at 65° C. for 3.5 hours, thereafter added with the water glass solution for adjusting the pH to 5.8, and then mixed with a 30% aqueous slurry of rare earth exchanged crystalline aluminosilicate zeolite Y, designated as RE-Y, (exchange rate 67%) so that the aluminosilicate zeolite amount might become 15% based on the weight of the final catalyst composition. This mixture was spray-dried in a hot air at a temperature of 220° C., and then the thus obtained particle was washed and then dried to prepare Catalyst Composition A. The sodium content of this composition was 0.12 wt. % as $Na_2O$.

Composition A was divided into 7 parts. One of them itself was named Catalyst A-1. Another part was dispersed in a solution of sodium chloride, and same was stirred for 60 minutes. Thereafter, the solution was removed. Then, the particle was washed with a warm water until no $Cl^-$ could be detected in the filtrate, and then dried to obtain Catalyst A-2 whose sodium content was 1.03 wt. % as $Na_2O$.

The remaining 5 parts were dispersed in the lithium chloride solution different in concentration respectively, and then subjected to filtration, washing and drying to thereby prepare Catalysts A-3 to A-7. The lithium contents of these catalysts were 0.13 wt. %, 0.51 wt. %, 1.02 wt. %, 4.50 wt. % and 6.00 wt. % respectively in order.

EXAMPLE 2

Catalyst Composition B was obtained according to the exactly same procedure as Example 1 except that the aqueous slurry of crystalline aluminosilicate zeolite used in Example 1 was replaced by an ammonium exchanged crystalline aluminosilicate zeolite Y (exchange rate 92%) and the amount used was altered so that the aluminosilicate zeolite amount might become 20% based on the weight of the final catalyst compositions. The sodium content of this composition was 0.08 wt. % as $Na_2O$.

Composition B was divided into two parts. One of them itself was named Catalyst B-1. Another part was dispersed in the solution of lithium chloride. This dispersion was stirred for 60 minutes. Thereafter, the solution was removed. The particle was washed with a warm water until no $Cl^-$ could be detected from the filtrate and then dried to thereby obtain Catalyst B-2. The lithium content of this catalyst was 0.36 wt. % as $Li_2O$.

CATALYTIC PERFORMANCE TEST

Catalysts obtained in Examples 1 and 2 were each calcined at 600° C. for 2 hours, thereafter treated at 750° C. for 17 hours in a 100% steam atmosphere, and calcined at 600° C. for 1 hour again. The thus treated catalysts were each subjected to cracking test. As the feed oil, there was employed a desulfurized vacuum gas oil. As the reaction conditions, there were employed the following conditions: reaction temperature=482° C., WHSV=2.2 $hr^{-1}$, and catalyst/oil weight ratio=5.6. In order to evaluate the thermal and hydrothermal stability, part of catalysts were calcined at 600° C. for 2 hours, subjected to 17 hours' treatment at 810° C. in a 100% steam atmosphere, calcined again at 600° C. for 1 hour, and then subjected to cracking test.

Furthermore, in the step for regenerating each deactivated catalyst used in the cracking reaction which comprises heating the deactivated catalyst to 630° C. and contacting the air therewith for burning the coke deposited on the catalyst, the $CO_2/CO$ molar ratio of the combustion gas was measured when the amount of coke on the catalyst was reduced to 0.3 wt. %. The obtained test results will be shown in the following table together with the catalyst compositions.

TABLE 1

| Catalyst | A-1 | | A-2 | | A-3 | | A-4 | A-5 | | A-6 | A-7 | | B-1 | | B-2 | |
|---|---|---|---|---|---|---|---|---|---|---|---|---|---|---|---|---|
| Porous matrix wt. % | ← Silica-alumina 85 wt. % → | | | | | | | | | | | | Silica-alumina 20 wt. % | | | |
| Crystalline alumino-silicate | ← RE-Y → | | | | | | | | | | | | ← H-Y → | | | |
| $Na_2O$ in catalyst wt. % | 0.12 | | 1.03 | | 0.12 | | 0.12 | 0.12 | | 0.12 | 0.12 | | 0.08 | | 0.08 | |
| $Li_2O$ in catalyst wt. % | 0 | | 0 | | 0.13 | | 0.51 | 1.02 | | 4.5 | 6.0 | | 0 | | 0.36 | |
| Steaming °C. | 750 | 810 | 750 | 810 | 750 | 810 | 750 | 750 | 810 | 750 | 750 | 810 | 750 | 810 | 750 | 810 |
| Cracking test results | | | | | | | | | | | | | | | | |
| Conversion vol % | 81.5 | 73.8 | 81.8 | 73.9 | 82.4 | 75.4 | 84.1 | 85.3 | 81.1 | 83.8 | 79.1 | 72.9 | 79.1 | 71.3 | 82.3 | 78.6 |
| $C_5^+$ gasoline wt. % | 54.8 | 54.1 | 55.8 | 55.3 | 56.9 | 56.2 | 63.3 | 64.8 | 60.6 | 63.1 | 58.3 | 52.5 | 53.4 | 46.1 | 57.6 | 54.6 |
| Hydrogen wt. % | 0.20 | 0.22 | 0.21 | 0.19 | 0.20 | 0.21 | 0.16 | 0.16 | 0.14 | 0.15 | 0.15 | 0.16 | 0.37 | 0.30 | 0.31 | 0.22 |
| Coke wt. % | 5.8 | 3.5 | 5.3 | 3.1 | 5.2 | 3.3 | 5.3 | 5.5 | 3.8 | 5.3 | 5.4 | 3.7 | 4.9 | 3.2 | 5.3 | 4.9 |

TABLE 1-continued

| Catalyst | A-1 | | A-2 | | A-3 | | A-4 | A-5 | A-6 | A-7 | | | B-1 | | B-2 | |
|---|---|---|---|---|---|---|---|---|---|---|---|---|---|---|---|---|
| $CO_2/CO$ molar ratio | 2.5 | 2.5 | 2.8 | 2.7 | 2.7 | 2.7 | 3.3 | 3.7 | 3.6 | 4.1 | 4.3 | 4.1 | 2.2 | 2.2 | 3.8 | 3.7 |

$C_5^+$ gasoline: Range of boiling point $C_5$ - 204° C.

What is claimed is:

1. A hydrocarbon catalytic cracking catalyst composition comprising: a porous siliceous matrix, a crystalline aluminosilicate zeolite dispersed in said matrix, and a lithium component, the $Na_2O$ content of said composition being less than 1.0% by weight, said composition having been prepared by spray-drying an aqueous slurry of a mixture of a precursor of said porous siliceous matrix and said crystalline aluminosilicate zeolite and thereby obtaining spherical particles, washing said particles and then introducing and uniformly dispersing said lithium component throughout the particles.

2. A catalyst composition according to claim 1 wherein the amount of said lithium component is 0.1-5.0% by weight of the catalyst composition, calculated as the oxide.

3. A catalyst composition according to claim 1 which contains said crystalline aluminosilicate in an amount ranging from 5 to 50 wt. %.

4. A catalyst composition according to claim 1 which contains silica derived from the matrix in an amount of 5 wt. % or more.

5. A catalyst composition according to claim 1 in which said zeolite is selected from the group consisting of hydrogen exchanged-zeolite and rare earth metal exchanged-zeolite and said particles are impregnated with said lithium component.

6. A hydrocarbon catalytic cracking catalyst composition comprising: a porous siliceous matrix, from 5 to 50% by weight of crystalline aluminosilicate zeolite dispersed in said matrix, said crystalline aluminosilicate zeolite being selected from the group consisting of hydrogen exchanged-zeolites and rare earth metal exchanged-zeolites, and a lithium component, the $Na_2O$ content of said catalyst composition being less than 1.0% by weight, said catalyst composition having been prepared by spray-drying an aqueous slurry of a mixture of a precursor of said porous siliceous matrix and said crystalline aluminosilicate zeolite and thereby obtaining spherical particles, washing said particles until the $Na_2O$ content of said particles is less than 1.0% by weight, drying said particles, then uniformly impregnating said particles with an aqueous solution of an inorganic, water-soluble lithium compound so that said particles contain from 0.1 to 5% by weight of lithium, calculated as $Li_2O$, and then drying said particles.

7. A catalyst composition according to claim 6 in which said lithium compound is selected from the group consisting of lithium chloride, lithium nitrate, lithium sulfate and lithium hydroxide.

* * * * *